J. W. BUTLER.
FUSIBLE LINK.
APPLICATION FILED NOV. 30, 1917.
1,311,873.
Patented Aug. 5, 1919.
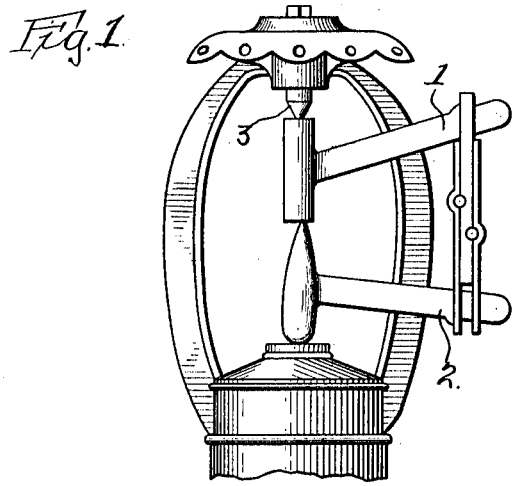
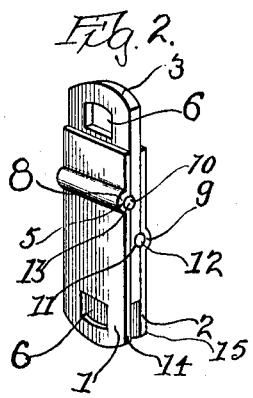 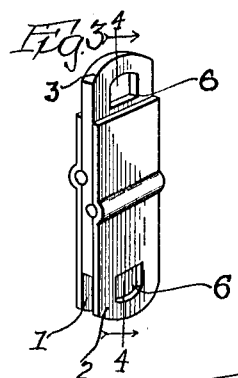 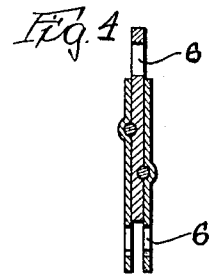
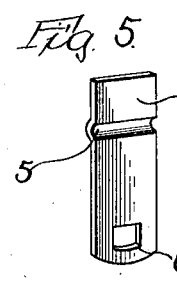 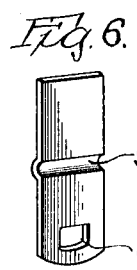 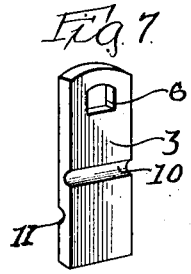 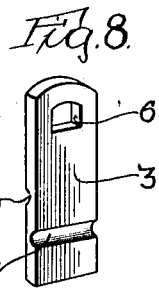
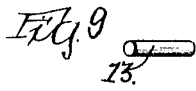
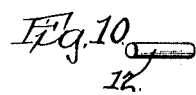
Inventor:
Jay W. Butler
By Harry Lea Dodson
Atty.

UNITED STATES PATENT OFFICE.

JAY W. BUTLER, OF GLENCOE, ILLINOIS.

FUSIBLE LINK.

1,311,873.   Specification of Letters Patent.   Patented Aug. 5, 1919.

Application filed November 30, 1917. Serial No. 204,588.

*To all whom it may concern:*

Be it known that I, JAY W. BUTLER, a citizen of the United States, residing at Glencoe, in the county of Cook and State of Illinois, have invented a certain new and useful Improvement in Fusible Links, of which the following is a specification.

My invention pertains to that class of devices which is adapted for use in any and all situations in which, when subjected to heat above a predetermined temperature, the fusible material which holds the link in position will yield so as to cause the link to separate, thereby permitting the device which was held under tension by means of the link to operate such for instance as the opening or closing of an electrical circuit or the releasing of the valve on a sprinkler head of an automatic fire extinguisher system.

My invention has for its object to provide a link in which the tensile strain put upon it will be carried by other members whereby the strain will be resisted by a special construction of link rather than by the structure of the fusible material, and has for its further object to provide a construction whereby the component parts of the link will be held under tension so that when the heat is applied, the parts of the link are immediately thrown apart when the heat rises above a predetermined point.

My invention has for its further object to construct a link which will increase the general efficiency and serviceability of a device of this character.

My means of accomplishing the foregoing objects may be more readily understood by having reference to the accompanying drawings which are hereto annexed and are a part of this specification, in which:

Figure 1 is a side elevation of a sprinkler head equipped with my improved fusible link.

Figs. 2 and 3 are isometric perspective views of the opposite sides of a link, constructed in accordance with my invention.

Fig. 4 is a cross section taken through the line 4—4 in Fig. 3.

Figs. 5, 6, 7, 8, 9 and 10 are detail views of the various members forming the link.

As shown in the drawings, my device consists of two outer plates 1 and 2 and an intermediate plate 3. The plates 1 and 2 are provided with notches 5 and holes 6 in their opposite ends. Semi-cylindrical transverse grooves 8 and 9 are formed in the plates 1 and 2 respectively; the groove 8 in the plate 1 being near the end having the notch, while the groove 9 in the plate 2 is near the end having the hole formed therein.

The intermediate plate 3 is provided with semi-cylindrical grooves 10 and 11 which are adapted to register with semi-cylindrical grooves 8 and 9 formed in the outer plates 1 and 2.

In the grooves are mounted rollers 12 and 13 upon which the plates rock so that when a tension is put upon the holes in the head of the plate, it tends to separate the grooved ends of the outer plates 1 and 2.

The link is assembled in the following manner: The grooves 8 and 9, 10 and 11 are first tinned by the application of the fusible material as are also the rollers 12 and 13. The link is then assembled as clearly seen in Figs. 2 and 3, and all of the links are then fastened together by the application of the fusible solder which is preferably formed of material which will fuse in very low temperature. The link then presents a complete entity in which the rocking motion of the outer plates is resisted by the fusible material. At the same time it will be apparent to persons skilled in the art that the great tensile strain put upon the link through the medium of holes in the outer plates 1 and 2, will be to cause the opposite ends to spring apart so that when the temperature to which the link is subjected rises sufficiently high to melt the fusible material, the ends 14 and 15 of the outer plates 1 and 2 will be drawn together and the opposite ends separated, thereby causing the link to fly into its various parts, thus entirely releasing whatever device it might be controlling.

As shown in Fig. 1 the device is applied to any ordinary type of sprinkler head which is provided with arms 15 and 16, the outer ends of which engage the holes in the link, the inner end of the arms serving to close the valve and thereby shut off the water. It will be apparent that the pressure of the water tends to separate the outer ends of the arms 14 and 15 and in this manner exerts a tension upon the link, which when subjected to heat sufficiently to melt the fusible material, will operate as above set forth and forcibly and quickly separate the link into its various parts and thereby release the valve and permit the ingress of the water.

Having described my invention, what I regard as new and desire to secure by Letters Patent is:

1. A device of the character described comprising two outer and one intermediate plate, there being semi-cylindrical grooves in said plates adjacent opposite ends of said outer plates, there being corresponding semi-cylindrical grooves on opposite faces of the intermediate plate adapted to register with the grooves in the outer plates, rollers which are fitted to and coincide with said grooves mounted therein and a fusible substance connecting the inner faces of two outer plates with the two faces of the intermediate plate and the rollers.

2. A device of the character described comprising two outer and one intermediate plate, there being grooves on the inner face of each of the outer plates and corresponding grooves on the opposite sides of the intermediate plates adapted to register with the grooves in the outer plates, two cylindrical rollers mounted in said grooves and fusible substance connecting the plates and rollers.

3. A fusible connecting link having securing means at its opposite end and comprising three members formed of sheet metal, there being semi-cylindrical transverse grooves formed on the inner face of the outer members and corresponding grooves which register with the first named groove on the opposite faces of the intermedate member, rollers mounted in said grooves, a fusible substance which holds said members normally in engagement, said plates and rollers being in arrangement whereby a tensile strain put upon the securing means at the opposite ends tends to separate the plates.

In testimony whereof I have signed the foregoing specification.

JAY W. BUTLER.

Copies of this patent may be obtained for five cents each, by addressing the "Commissioner of Patents, Washington, D. C."